Nov. 30, 1926.  V. WEIL  1,609,232

COLOR PHOTOGRAPHY

Filed Oct. 8, 1925

Inventor:
Valentin WEIL
Attorneys.

Patented Nov. 30, 1926.

1,609,232

UNITED STATES PATENT OFFICE.

VALENTIN WEIL, OF BERGEN, GERMANY.

COLOR PHOTOGRAPHY.

Application filed October 8, 1925, Serial No. 61,299, and in Germany August 23, 1923.

The invention relates to the production of cinematographic films or the like, in natural colors by the employment of light filters or color screens, and an object of the invention is to superimpose the transparent composition which constitutes the light filter directly upon the sensitized layer of the film in such a manner as not to affect the action of the developing and fixing baths.

A further object of the invention is to provide for transferring the composition to the film by mechanical printing means.

The production of colored cinematographic films, photographic transparencies and paper prints by photographic means is quite possible theoretically with the assistance of a color screen or light filter. The known methods of producing such color screens are however troublesome and are not sufficiently reliable to be applied in practice without further precautions either to films or to paper prints.

The colored screen members have not been sufficiently resistant to withstand the action of developing and fixing baths. Hence hitherto it has been necessary to introduce the color screen only beneath the photographic layer and to protect it by means of a coating of lacquer.

It has been universally assumed hitherto that extremely small color screen particles or light filtering particles were necessary for the making of successful screens for taking photographs. Experiments have shown however that it is possible to produce perfect color pictures by the use of a color screen composed of color elements or particles which are very much larger than the granules which have been hitherto used in such screens.

Knowledge of the above fact has suggested that it should be possible to make such a color screen in a very simple and cheap manner by a suitable mechanical printing process and it has been proved that filter elements could be reproduced free from defects by printing methods. By such methods no difficulties were met with provided the printed color screen could be made in such a way that in the printing of the color screen the points of color came to lie side by side so that a completely closed color screen was produced although this result need not actually be attained in practice because the color elements are likely to overlap and yet this does not produce any serious optical defect. If the surface of the film is not completely covered with color elements any optical defect can be ignored as practically not noticeable with the size of filter elements used for the present purpose and it produces noticeable effects in the diffraction of light only if the size of the areas is extremely small.

According to the present invention the color areas are produced by direct mechanical printing methods using any suitable printing process, even a stereotype process using appropriate printing colors having the right optical effects.

The advantage of this process consists in the cheap production of color screens of any desired size, and in the possibility of making such screens with color points in them of any desired size, as also in the fact that the colors can not be attacked by the developing and fixing baths. While making use of this valuable property, if the production of the color screen is carried out in such a way that slight spaces not discernible by the eye are left between the various points of color, the application of the screen so made upon the photographic sensitive layer is rendered possible. The printing colors for the production of the color screen must primarily be transparent to light, and they may be such as are produced when suitable light-filter coloring materials such as fuchsin

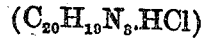

and the like are deposited as color lakes on a suitable base such for example as aluminium hydroxide. This coloring matter when thoroughly ground or rubbed together with linseed oil varnish and suitable additions such for example as copal, dammar and the like, then give a crystal clear printing color having excellent light-filtering qualities.

For the purpose in view also fat-soluble coloring matters can be used. The necessary consistency of the printing paste is attained in this case by further grinding or distintegration of this coloring matter after its deposition on aluminium hydroxide. Additions of suitable substances such as copal, dammar and so forth can be introduced and Canada balsam can also be added if special light-separating properties are to be given to the varnish. The light-filter coloring matters produced for printing as above are therefore much better in regard to their transparency and permanence of color than the light-filter granules which have been used hitherto. Thorough researches have proved that from the optical point of view color screens of high efficiency can be produced in this way.

The present invention is illustrated in the accompanying drawings, in which.

Figure 1:
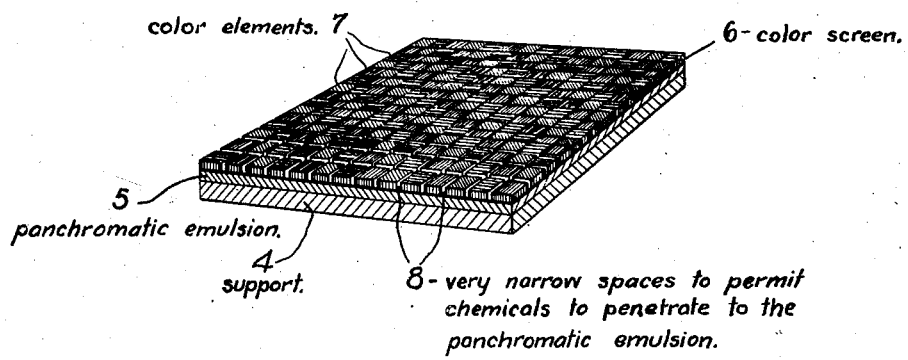
Fig. 1 is a perspective view of a film embodying one form of the invention.

In Fig. 1, 4 represents the support, of celluloid or other material, carrying a panchromatic emulsion layer 5. Upon layer 5 is imposed, by suitable printing means, a color screen 6, consisting of small areas or points of differently colored elements 7, separated by very narrow spaces 8, which permit the developing and fixing chemicals to penetrate to the sensitized layer 5.

Figure 2:
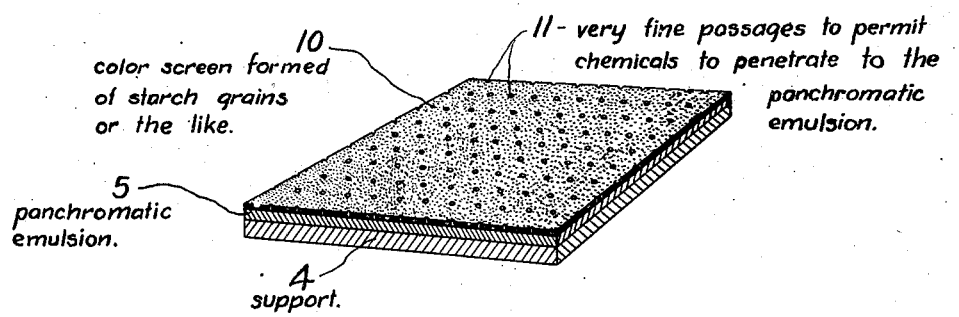
Fig. 2 is a similar view of a modification.

The structure shown in Fig. 2 is the same, except that the color screen 10 consists of a continuous coating of varnish containing two or more pigments mixed therein, and applied to the film by any suitable process. The color screen 10 is perforated by very fine passages 11, which have the same function as spaces 8.

It has been found that for ordinary transparencies it suffices to use light-filter elements of a size such as is used in the screens of modern printing blocks (see Fig. 1).

For projection pictures however such as cinematograph films and the like which are required to be capable of very great enlargement without displaying the pattern of the color filter it is necessary to employ filter elements which are smaller than any which have been practically possible hitherto. For this purpose colored pigments such as the very finest starch grains or the like, or even the larger colloids may be mixed direct with the varnish and any other necessary additions, and worked up into a printable filter pigment color, and this latter can be applied to the film by any suitable printing process to form a color screen (see Fig. 2).

For example two or more colored pigments may be introduced directly into the color produced as above described with aluminium hydroxide so that the color of a pigment is replaced by a light-filter coloring matter. The direct coloring of the adjacent filter particles one by another cannot occur because the coloring matter used is in the most finely divided form.

In order to render it possible to transfer copies of a color filter plate upon another color filter plate, the color areas of the color screen on which the copy is to be made, should be larger than those of the screen with which the photograph was taken. This requirement can easily be complied with by the printing process and it is of advantage in that it permits of the production of color screen elements of successively increasing size. The process offers the possibility at once of making the various color elements of variable area in plan while they are of the same height so that their area may be increased for example. This is of importance because the color screen elements should be able to expand in area but should not be able to increase in height in order that they may not have an unfavorable action as regards transparency to light. In order to render it possible to apply the color screen upon the photographic layer and yet to permit the plate or film to be developed although the color screen itself is not permeable by the developing and fixing baths, extremely small spaces as already mentioned which are not directly visible to the eye are left in the screen. The developer passing through these spaces comes first into contact with the sensitized layer which consists of an absorbent mass such as gelatine or the like, and it is then dispersed by lateral spreading into the areas beneath the actual color screen elements. Experiments have shown that these small gaps or spaces between the color screen elements produce no optical defects. They may however be filled up with soot or lamp black for example without interfering with the permeability of the layer to the developing and fixing solutions.

A plate or film produced as above described only requires about a quarter of the time of exposure that is required for the well known auto chrome plates having a color screen beneath the photographic layer, so that by the use of this invention it is possible to take snap-shots by the use of a rapid objective lens with very short exposures.

Having thus described my invention what I claim as new and desire to secure by Letters Patent is:—

1. Process for the production of a photographic sensitized surface for color photography consisting in impressing upon the light-sensitive layer a multi-color screen by means of mechanical printing with light transmitting coloring matter, the color elements of the screen consisting of points of color separated by very small spaces through which the solutions used in preparing the photographic prints can penetrate down to the absorbent sensitized layer.

2. Process for the production of a photographic sensitized surface for color photography consisting in making a mechanical printing composition from very fine colored particles and printing mechanically a screen with the said composition on the photographic sensitized surface.

3. Process for the production of a photographic sensitized material for color photography consisting in applying a light sensitive emulsion to a white background, and impressing upon said emulsion by mechanical means a light filter screen composed of a large number of separate translucent points of colored material.

4. A process for producing a photographic film for color photography, comprising superimposing a light filter upon the sensitized surface of the film by mechanical printing means, said light filter being made up of points of colored matter separated from each other by spaces through which chemicals may penetrate to the sensitized surface.

5. A film for color photography, comprising a support, a panchromatic emulsion layer on said support, and a color screen on said panchromatic layer, said color screen consisting of color elements separated from each other by narrow spaces extending both longitudinally and transversely of the film and adapted to permit chemicals to penetrate to said layer.

In witness whereof I affix my signature.

VALENTIN WEIL.